No. 796,937. PATENTED AUG. 8, 1905.
R. O. SCHEEL.
ADVERTISING DEVICE.
APPLICATION FILED JAN. 14, 1905.
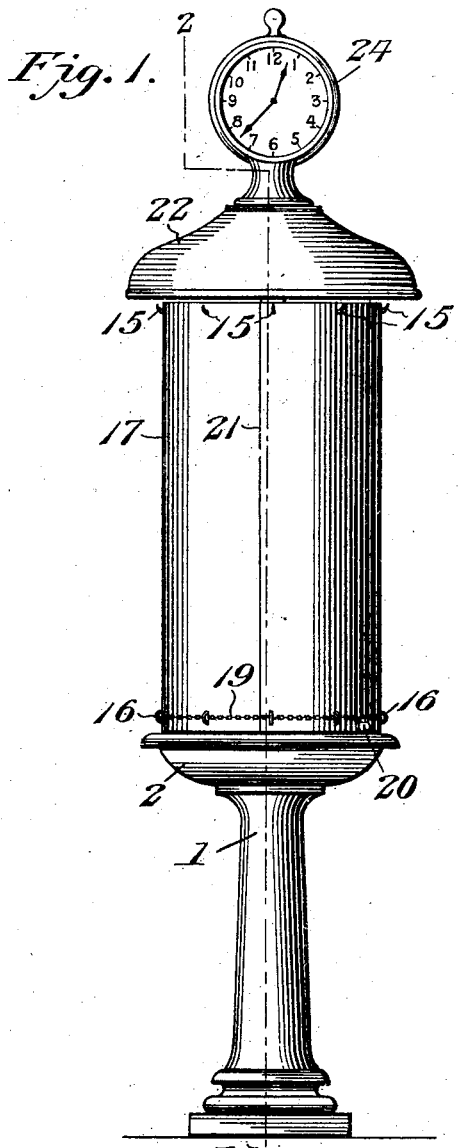
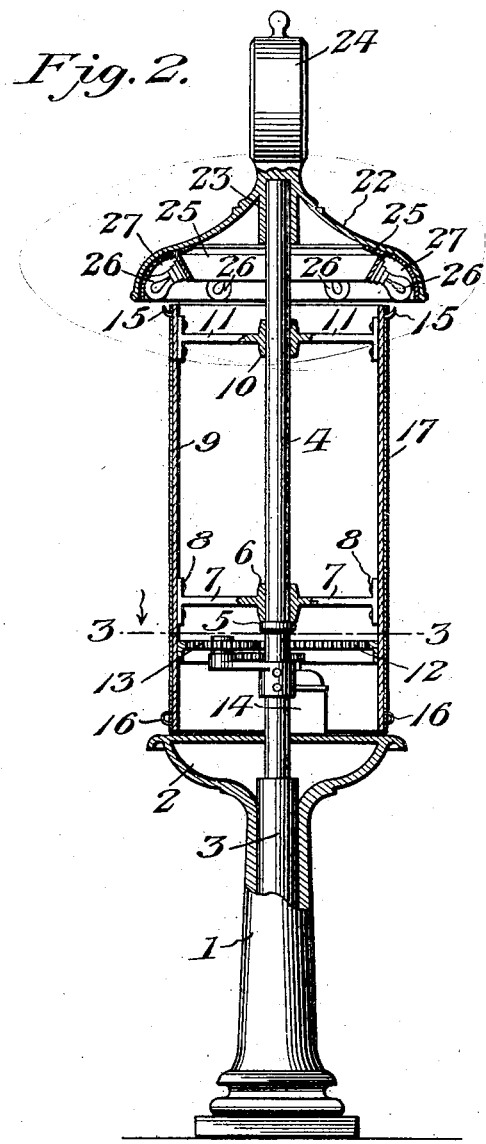
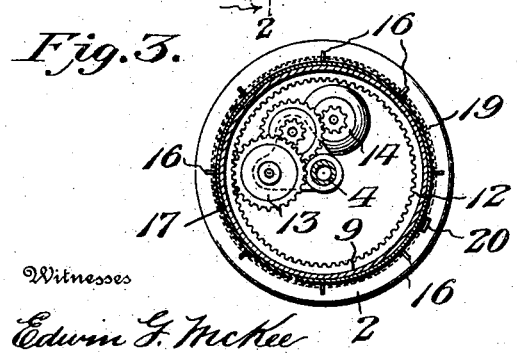
Witnesses
Edwin F. McKee
W. H. Clarke
Inventor
Richard O. Scheel
By Victor J. Evans
Attorney

UNITED STATES PATENT OFFICE.

RICHARD O. SCHEEL, OF PHILADELPHIA, PENNSYLVANIA.

ADVERTISING DEVICE.

No. 796,937. Specification of Letters Patent. Patented Aug. 8, 1905.

Application filed January 14, 1905. Serial No. 241,147.

*To all whom it may concern:*

Be it known that I, RICHARD O. SCHEEL, a citizen of the United States, residing at Philadelphia, in the county of Philadelphia and State of Pennsylvania, have invented new and useful Improvements in Advertising Devices, of which the following is a specification.

This invention relates to advertising devices.

As is well known, the common method of advertising is to paste show-bills or other advertising matter upon fences, blank walls, and the like. An objection to this form of advertising is that the advertisements frequently become discolored, torn, or defaced as the result of rain or by reason of the fact that they are printed upon an inferior quality of paper.

The object of the present invention is to avoid the objections to the old methods of advertising without sacrificing their advantages.

With the foregoing and other minor objects in view the invention resides in the employment of a flexible element, such as canvas or the like, upon which the advertisements are pasted or secured in any suitable manner, said flexible element being then suspended from and locked securely upon a support in such manner that it may be removed easily and quickly when it is desired to substitute a similar flexible element containing different advertising matter.

The invention also resides in the novel combination and arrangement of parts and in the precise details of construction hereinafter described and claimed as a practical embodiment thereof.

In carrying the present invention into practice it is preferable that a plurality of flexible elements, such as strips of canvas or other strong and durable material, be used. If it be desired, for example, to advertise the weekly or other periodical engagements of a theater the appropriate show-bills are pasted upon the flexible elements each week, and said elements are distributed throughout the various sections of the city by bill-posters and are suspended from and locked securely upon the novel form of support hereinafter described. Each time the advertisements are changed the flexible elements containing the old advertisements are carried back to the distributing-station or factory, where they are subjected to any suitable process, such, for example, as soaking in water, to remove the old advertising matter, and thus adapt the flexible elements to receive new advertising matter. If desired, instead of removing the old advertising matter each week the new matter may be pasted thereon until several superimposed layers shall have been produced, after which all of the layers may be removed at one operation.

In order that the invention may be more clearly understood, reference is had to the accompanying drawings, forming part of this specification.

Figure 1 is a side elevation of a support used in connection with the invention. Fig. 2 is a vertical section thereof, partly in elevation. Fig. 3 is a horizontal section on the line 3 3 of Fig. 2. Fig. 4 is a detail view showing a part of the flexible element fitted over one of the locking staples or eyes.

Like reference-numerals indicate corresponding parts in the different views.

The reference-numeral 1 indicates a base which is formed, preferably, with a flared or enlarged upper end 2. Disposed in the base 1 is a socket-piece 3, which may be of any suitable form and construction. A non-rotatable rod or shaft 4 extends through the flared upper end 2 of the base 1 and is stepped in any suitable manner in the socket-piece 3. The non-rotatable shaft 4 is provided with a collar 5, upon which rests a hub 6, formed with radiating arms 7, which are attached at their outer ends by means of rivets 8 to the interior periphery of a rotatable cylinder 9. A second hub 10 surrounds the non-rotatable shaft 4 and is provided with radiating arms 11, similar to the arms 7 and adapted to support the upper end of the cylinder 9. The cylinder 9 is adapted to be rotated in any suitable manner—as, for example, by means of an internal gear element 12, with which meshes a suitable train of reduction-gear 13, operated by means of any convenient form of motor 14.

Surrounding the outer periphery of the cylinder 9, at the upper end thereof, is a plurality of upwardly-bent hooks 15, a plurality of eyes or staples 16 being attached in any suitable manner to the lower end of said cylinder 9, as shown. A flexible element 17, such as a strip of canvas or the like adapted to receive advertising matter, is engaged at its upper end with the hooks 15 and is formed at its lower end with a plurality of slots 18, each of which is adapted to be fitted over one of the eyes or staples 16. After the flexible element 17 has been engaged with the hooks 15 and eyes or staples 16 a flexible locking element 19, such as a chain or the like, is passed through said eyes or staples outside the flexible advertisement-receiving element 17, the ends of said flexible locking element 19 being connected and locked in any suitable manner, as by means of a padlock 20. It will be understood that the flexible advertisement-receiving element 17 is in the form of a flat strip which is wrapped around the cylinder 19, the seam formed by the meeting ends of said flexible element being indicated by 21.

An approximately cone-shaped cap 22, which is of greater diameter than the cylinder 9, is mounted upon the non-rotatable shaft 4 by means of a suitable integral socket 23. If desired, a clock 24 may be mounted upon said cap. Attached in any suitable manner to a concentric flange 25 on the interior of the cap 22 is a plurality of illuminating devices 26, which by means of an annular reflector 27 serve to illuminate the flexible element 17.

Having thus fully described the invention, what is claimed as new is—

1. An advertising device comprising a rotating cylindrical support, a flexible receiving element to envelop said support, means for supporting the upper end of said element, and means for locking the lower end of said element upon said support.

2. An advertising device comprising a support having hooks and eyes, a flexible advertisement-receiving element adapted to be engaged with the hooks and having slots to fit the eyes, and a flexible locking element adapted to be passed through the eyes to lock the advertisement-receiving element in place.

3. An advertising device comprising a rotary member having hooks and eyes, and a flexible advertisement-receiving element adapted to be engaged with the hooks and having slots to receive the eyes, a flexible locking element adapted to be passed through the eyes, and means for locking the ends of said flexible locking element.

4. An advertising device comprising a base having a flared upper end, a socket-piece in said base, a non-rotatable shaft stepped in said socket-piece, a rotary cylinder journaled upon said non-rotatable shaft, upwardly-bent hooks at the upper end of said rotary cylinder, eyes at the lower end of said cylinder, a flexible advertisement-receiving element engaged by the hooks at its upper end and having slots at its lower end to receive the eyes, a chain extending through said eyes, a locking device connecting the ends of said chain, a cone-shaped cap of greater diameter than the rotary cylinder and having a socket fitted over the non-rotatable shaft, an annular flange inside the cone-shaped cap, a plurality of illuminating devices upon the flange, and an annular reflector carried by the cap.

5. An advertising device comprising a rotating support, a strip of fabric to envelop said support for the reception of advertising-sheets, means for supporting the upper end of said fabric, and means for locking the lower end of said fabric to the support.

6. An advertising device comprising a rotating support, a sheet of fabric surrounding said support, means for securing the upper end of the fabric to the support, eyes projecting from said support and engaging openings formed in the fabric, and a chain adapted to be passed through the eyes and secure the fabric in place.

In testimony whereof I affix my signature in presence of two witnesses.

RICHARD O. SCHEEL.

Witnesses:
   GEO. CORBIN,
   WM. H. COURTENAY.